US009540570B2

(12) United States Patent
Crowe et al.

(10) Patent No.: US 9,540,570 B2
(45) Date of Patent: Jan. 10, 2017

(54) PINNED FURNACE TUBES

(71) Applicant: NOVA Chemicals (International) S.A., Fribourg (CH)

(72) Inventors: Jeffrey Stephen Crowe, Calgary (CA); Mark Andrew Taylor, Red Deer (CA)

(73) Assignee: NOVA Chemicals (International) S.A., Fribourg (CH)

( * ) Notice: Subject to any disclaimer, the term of this patent is extended or adjusted under 35 U.S.C. 154(b) by 87 days.

(21) Appl. No.: 14/612,509

(22) Filed: Feb. 3, 2015

(65) Prior Publication Data

US 2015/0240168 A1    Aug. 27, 2015

(30) Foreign Application Priority Data

Feb. 21, 2014  (CA) ..................................... 2843361

(51) Int. Cl.
| | | |
|---|---|---|
| *C10G 9/20* | (2006.01) |
| *B01J 19/24* | (2006.01) |
| *B01J 19/00* | (2006.01) |
| *B01J 19/02* | (2006.01) |
| *C22C 19/05* | (2006.01) |
| *C22C 19/07* | (2006.01) |
| *C22C 30/00* | (2006.01) |

(Continued)

(52) U.S. Cl.
CPC .............. *C10G 9/203* (2013.01); *B01J 19/006* (2013.01); *B01J 19/0013* (2013.01); *B01J 19/02* (2013.01); *B01J 19/2415* (2013.01); *C10G 9/20* (2013.01); *C22C 19/058* (2013.01); *C22C 19/07* (2013.01); *C22C 30/00* (2013.01); *F16L 9/02* (2013.01); *F28F 1/16* (2013.01); *B01J 2219/00157* (2013.01); *B01J 2219/029* (2013.01)

(58) Field of Classification Search
CPC ........ C10G 9/20; C10G 9/206; B01J 19/0013; B01J 19/006; B01J 19/02; B01J 19/2415; B01J 2219/00157; B01J 2219/029
See application file for complete search history.

(56) References Cited

U.S. PATENT DOCUMENTS

| 1,929,444 A * | 10/1933 | Murray ................. F22B 37/106 |
| | | 122/235.11 |
| 3,476,180 A | 11/1969 | Straight, Jr. et al. |
| 5,437,247 A | 8/1995 | Dubil et al. |

(Continued)

FOREIGN PATENT DOCUMENTS

CA        1309841        11/1992

OTHER PUBLICATIONS

Detemmerman, T. and Froment, F.; Three Dimensional Coupled Simulation of Furnaces and Reactor Tubes for the Thermal Cracking of Hydrocarbons; Revue de L'Institut Francais de Petrole, vol. 53, No. 2, Mar.-Apr. 1998, pp. 181-194.

(Continued)

*Primary Examiner* — Lessanework Seifu
(74) *Attorney, Agent, or Firm* — Julie L. Heinrich

(57) ABSTRACT

In an embodiment of the invention, furnace tubes for cracking hydrocarbons having a longitudinal array of pins having i) a maximum height from 0.5-1.3 cm; ii) a contact surface with the tube, having an area from 0.1%-10% of the tube external surface area iii) a uniform cross section along the length of the pin. (i.e. they are not tapered); and iv) a length to diameter ratio from 1.5:1 to 0.5:1 have an improved heat transfer over bare fins and reduced stress relative to a fined tube.

22 Claims, 12 Drawing Sheets

(51) Int. Cl.
*F16L 9/02* (2006.01)
*F28F 1/16* (2006.01)

(56) References Cited

U.S. PATENT DOCUMENTS

| | | |
|---|---|---|
| 5,950,718 A | 9/1999 | Sugitani et al. |
| 6,250,340 B1 | 6/2001 | Jones et al. |
| 6,364,658 B1 * | 4/2002 | Ganeshan ............ F22B 37/106 165/181 |
| 2012/0275966 A1 * | 11/2012 | Petela .................. B01J 19/0013 422/198 |

OTHER PUBLICATIONS

De Saegher, J. J., Detemmerman, T. and Froment, G. F.; Three Dimensional Simulation of High Severity Internally Finned Cracking Coils for Olefins Production; REvue de L'Institut Francais du Petrole, vol. 51, No. 2, Mar.-Apr. 1996, pp. 245-260.

* cited by examiner

F: Bare
Equivalent Stress
Type: Equivalent (von-Mises) Stress
Unit: MPa
Time: 1
3/28/2013 9:16 AM 60.951 Max
54.188
47.424
40.661
33.898
27.135
20.372
13.609
6.8457
0.082552 Min

PINNED FURNACE TUBES

FIELD

In some embodiments, the present invention relates to the field of cracking paraffins to olefins and, for example, to pins (spines or studs) in a longitudinal array on the external surface of the process coil(s) in the radiant section of a cracking furnace. The pins can be spaced apart in a regular pattern, or the spacing and length of the pins may vary to provide a profile to the array of pins. The profile of the array may be varied depending on the exposure of the coil to local radiation intensity in a furnace. A size of a single pin should be such that its base (a contact surface with a coil) should not exceed 10% of the coil external surface area, and its height should not exceed 20% of the coil internal diameter.

In some embodiments, these pins increase net transfer of radiant and convective heat from flame, combustion gases and surrounding furnace walls, into the external surface of the process coil.

BACKGROUND

The field of heat exchanger designs is replete with applications of fins to improve the heat transfer. In some embodiments, this is heat transfer by forced convection mechanism. The heat transfer by forced convection takes place between a solid surface and fluid in motion, which may be gas or liquid, and it comprises the combined effects of conduction and fluid flow. This type of heat transfer occurs in most of the conventional heating systems, either hot water or electric and industrial heat exchangers.

In the cracking process of a paraffin, such as ethane or naphtha, feed flows through a furnace coil (pipe) that is heated up to 1050° C. inside the radiant section of a cracking furnace. At these temperatures, the feed undergoes a number of reactions, including a free radical decomposition (cracking), reformation of a new unsaturated product and the coproduction of hydrogen. These reactions occur over a very short period of time that corresponds to the feed residence time in a coil.

The interior of the radiant section of the furnace is lined with heat absorbing/radiating refractory and is heated, for example, by gas fired burners. The heat transfer within the furnace, between flame, combustion gases, refractory and the process coils is mostly by radiation, and also by forced convection.

There is a drive to improve the efficiency of cracking furnaces as this reduces process costs and greenhouse gas emissions. There have been two main approaches to improving efficiency; improving heat transfer to the furnace coils, i.e., from flame, combustion gases and refractory walls to the external surface of a process coil, and improving heat transfer within the coil, i.e., from the coil walls into the feed flowing inside the coil.

One of the methods representing the second approach, is the addition of internal fins to the inner walls of the furnace coil, to promote the "swirling" or mixing of the feed within the coil. This improves the convective heat transfer from the coil walls to the feed as the turbulence of the feed flow is increased and the heat transferring surface of the hot inner wall of the coil is increased as well.

U.S. Pat. No. 5,950,718 issued Sep. 14, 1999 to Sugitani et al., assigned to Kubota Corporation provides one example of this type of technology.

The papers "Three dimensional coupled simulation of furnaces and reactor tubes for the thermal cracking of hydrocarbons", by T. Detemmerman, G. F. Froment, (Universiteit Gent, Krijgslaan 281, b9000 Gent-Belgium, mars-avri, 1998); and "Three dimensional simulation of high internally finned cracking coils for olefins production severity", by Jjo de Saegher, T. Detemmerman, G. F. Froment, (Universiteit Gent1, Laboratorium voor Petrochernische Techniek, Krijgslaan 281, b-9000 Gent, Belgium, 1998 provide a theoretical simulation of a cracking process in a coil which is internally finned with helicoidal and longitudinal fins (or, rather, ridges or bumps). The simulation results are verified by lab scale experiments, where hot air flows through such internally finned tubes. The papers conclude that the tube with internal helicoidal fins performs better then with internal longitudinal fins and that the results for "a tube with internal helicoidal fins are in excellent agreement with industrial observations". However, no experimental data are provided to support these conclusions. There is also no comparison made to the performance of a bare tube, with no internal ribs or fins. The authors agree that one potential disadvantage of such coils with internal fins is that carbon deposits may build up on the fins, increasing the pressure drop through the tube.

U.S. Pat. No. 3,476,180 issued Nov. 4, 1969 to Straight Jr. et al., assigned to Esso Research and Engineering Company teaches tubes for use in the convection section of a cracking furnace. There are pins that are on the surface of the downward face of the tubes in the convection section of the furnace. The pins are tightly packed and there is no dimension given for the length of the pin. In the convection section of the furnace, the feed is relatively cool. The heat loss from the pins is low. In the radiant section of the furnace, it may be necessary to limit the length of the pin or the pin may become a radiator, in effect, dissipating heat from the tube. The patent fails to suggest the subject matter of the present claims.

U.S. Pat. No. 5,437,247 issued Aug. 1, 1995 to Dubil et al., assigned to Exxon Research and Engineering Company teaches elongated plates pivotably mounted on at least one horizontal tube in a vertical row that is one row removed from the wall. When the plate is pivoted down, it prevents channeling of the hot gases through the convection section of the furnace (flue).

Canadian Patent No. 1,309,841 issued Aug. 25, 1988 to Fernandez-Baujin et al., assigned to Lummus Crest Inc., USA teaches putting "studs" ("pins") on the external and internal surfaces of pyrolysis coils used in the radiant section of a cracker. The "pins are not arranged in longitudinal rows. Additionally, the "pins" have a length from 0.5 to 0.75 inches. This is longer than the pin lengths disclosed herein.

U.S. Pat. No. 6,250,340 issued Jun. 26, 2001 to Jones et al., assigned to Doncasters PLC, teaches pipes for chemical reactions, such as, furnace tubes having internal grooves The report High Efficiency, Ultra low emissions, Integrated Process Heater by TIAX LLC of Jun. 19, 2006 to the U.S. Department of Energy, Golden Field Office discloses furnace tubes having studs 2 inches long and 0.5 inches in diameter. The studs were placed in longitudinal arrays on the side of the furnace tube facing the refractory wall. The studs have a length of 2 inches (page 3-26). This teaches away from the subject matter disclosed herein.

In some embodiments, the present invention seeks to provide an enhanced heat transfer, comparable to that of a fin, while reducing the stress on the tube or pipe.

SUMMARY

Disclosed herein is a tube for use in the radiant section of a furnace for cracking hydrocarbons to produce olefins having on its exterior surface a series of pins in one or more linear arrays parallel to the longitudinal axis of the tube, said pins having:

i) a height from 0.5 to 1.3 cm (0.25 inches to 0.5 inches) (e.g., from 3% to 15% of the tube outer diameter of the tube);

ii) a contact surface with the tube, having an area from 0.1% to 10% of the tube external surface area;

iii) a uniform cross section along the length of the pin. (i.e., they are not tapered)

iv) length to diameter ratio from 1.5:1 to 0.5:1

Also provided is the above tube, wherein the distance between consecutive pins within a given linear array is from 0.1 to 5 times the diameter of the pin.

Also provided is the above tube, comprising from about 55 to 65 weight % of Ni; from about 20 to 10 weight % of Cr; from about 20 to 10 weight % of Co; and from about 5 to 9 weight % of Fe and the balance one or more of the trace elements.

Also provided is the above tube, further comprising from 0.2 up to 3 weight % of Mn; from 0.3 to 2 weight % of Si; less than 5 weight % of titanium, niobium and all other trace metals; and carbon in an amount of less than 0.75 weight % the sum of the components adding up to 100 weight %.

Also provided is the above tube, comprising from 40 to 65 weight % of Co; from 15 to 20 weight % of Cr; from 20 to 13 weight % of Ni; less than 4 weight % of Fe and the balance of one or more trace elements and up to 20 weight % of W the sum of the components adding up to 100 weight %.

Also provided is the above tube, further comprising from 0.2 up to 3 weight % of Mn; from 0.3 to 2 weight % of Si; less than 5 weight % of titanium, niobium and all other trace metals; and carbon in an amount of less than 0.75 weight %.

Also provided is the above tube, comprising from 20 to 38 weight % of chromium from 25 to 48, weight % of Ni.

Also provided is the above tube, further comprising from 0.2 up to 3 weight % of Mn, from 0.3 to 2 weight % of Si; less than 5 weight % of titanium, niobium and all other trace metals; and carbon in an amount of less than 0.75 weight % and the balance substantially iron.

Also provided is the above tube, wherein the cross section of the pin is round.

Also provided is the above tube, wherein the cross section of the pin is quadrilateral.

Also provided is the above tube, wherein the pins in a linear array are of uniform height.

Also provided is the above tube, wherein the spacing between pins in a linear array is from 1 to 3 times the diameter of the pin.

Also provided is the above tube, wherein the pins in a linear array are of different heights to provide a profile to the array.

Also provided is the above tube, wherein at least part of the profile of an array is a taper or curve.

Also provided is the above tube wherein the central axis of the pin is at an angle from 90° to 60° relative to the external surface of the tube.

Disclosed herein are methods for making a tube as described above by welding (for example, electrical) any stud shaped piece or strip to the surface of the tube and then cutting the stud shaped pieces at a desired length.

DETAILED DESCRIPTION

Other than in the operating examples or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that can vary depending upon the properties desired. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In the manufacture of ethylene, a feed, (for example, a feed selected from $C_{2-4}$ alkanes), and naphtha is fed into one or more furnace coils comprising straight tubes and "U" bends which pass through a cracking furnace. The furnace, schematically shown in FIG. 1, includes two main parts: the convection section (1) where the feed (2) is initially preheated and initial cracking may occur, and the radiant section (3) where most of the final cracking process takes place. The radiant section of the furnace comprises the inlet (4), located downstream of the convection section (1) which accounts for about half of the furnace radiant section and is sometimes referred to as a "cold" box, and the outlet (5) referred to as "hot" box. The feed flows through the process coil (6) which includes a long coil (7), suspended inside the inlet (4) and outlet (5) radiant sections of the furnace. To increase the length of the coil and, thus, to allow for the adequate residence time of the feed inside both radiant parts of the furnace, the coil comprises multiple vertical straight tubes (7), referred to as "passes", inter-connected by return bends (8) (U-shaped elbows). As the feed flows through the coil passes in the inlet radiant furnace section (4), it is heated approximately to the temperature at which cracking reactions begin and further cracking occurs. Next, the feed leaves the inlet radiant section and flows through the passes of the process coils in the furnace outlet radiant section (5). In this section, the feed is further heated, the cracking reaction is progressing, until the final products exit the coil (9) and are further treated (e.g., quenching and separation) and recovered downstream. In both parts of the furnace radiant section, the feed is heated by flames and by combustion gases generated by the burners (10) which are mounted on the furnace walls and on the furnace bottom. Heat transfer from combustion gases and flames to the processing coil (6) occurs predominantly by radiation and also, to a lesser extent, by the mechanism of forced convection. Flame and combustion gases heat not only the coils but also the furnace walls. The walls which are lined with a heat absorbing/radiating refractory, radiate heat on the coil, thus contributing to heating process of the flowing feed (2) as well.

If the efficiency of the heat transfer to the process coil in a furnace radiant section is maximized or just increased, fuel consumption by the burners can be reduced and, consequently, so are greenhouse gas emissions reduced. The increased efficiency of heat transfer in the radiant section provides also another possibility, such that the fuel consumption can be kept unchanged, but furnace capacity can be increased, i.e., higher feed flow rates can be cracked in the coil.

In an embodiment of the present invention, at least a portion of the external surface of one or more passes of the coil or furnace tube is augmented with relatively small pins or studs in a longitudinal array (e.g., along the major axis of the tube.)

The pins or studs may have any cross section, such as, a quadrilateral (e.g., rectangular or square) or round or oval. The pin or stud will have a height (length) from about 3% to 15% of the outer diameter of the tube, or, for example, from 0.5 cm to 1.3 cm, or, for example, from 0.5 cm to 1.2 cm, or, for example, from 0.8 cm to 1 cm. The base of the pin may cover from 0.1 to 10%, or, for example, from 1 to 8%, or, for example, from 2 to 5% of the external surface area of the pipe or tube defined by the sum total contact area of all pins divided by the total surface area of the tube.

$$\text{area ratio (meter length)} = \frac{\text{Total pin base area}}{\text{Total tube external area}} = \frac{\#\frac{\text{pins}}{\text{m}} \times \frac{\pi OD_{pin}^2}{4}}{\pi OD_{tube} \times 1 \text{ m}}$$

The length to diameter ratio of the pin may be from 1.5:1 to 0.5:1, for example, from 1:1 to 0.5:1. In a longitudinal array the spacing of the pins may be from 5D (diameter of the pin) to D/10, for example, from 0.5D to 5D, or, for example, from 1D to 3D. However, it should be noted, that in any array, the spacing of the pins need not be uniform. For example, the spacing could be wider at the middle of the tube and closer towards the end of the tube. What is more desirable is to increase the heat flux into the tube. While generally it is easiest if the central axis of the pins are perpendicular to the surface of the tube they may be at an angle from 90° to about 60° relative to the surface of the tube. The pins or studs may have a uniform cross section along their length and are not tapered.

The longitudinal arrays are to be radially spaced apart along the surface of the tube by an angle from 30° to 180° so there may be from 12 to 2 longitudinal arrays on a pipe, for example, from 2 to 6 longitudinal arrays are used (e.g., radially spaced from 180° to 60°). The arrays need not be circularly parallel. That is, adjacent arrays could be offset so that the pins in one array match spaces in an adjacent array. Additionally, an array need not be uniform in height along its entire length. The array could have one or more sections of reduced height. For example, the array could reduce from a maximum height in the middle to a minimum height at each end (an inward facing parabola) or vice versa (an outward facing parabola) so that the array has a profile.

The location and arrangement of the arrays of pins should maximize radiant and convective heat flux into the coil. The location of the arrays and spacing and heights of the pins need not be uniform.

In designing the pins, care should be taken so that they absorb more radiant energy than they may radiate. This may be restated as the transfer of heat through the base of the pin into the coil should exceed that transferred to the equivalent surface on a bare coil at the same operational conditions. If the concentrations of the pins become excessive and if their geometry (height and diameter) is not selected properly, they may start to reduce heat transfer, due to thermal effects of excessive conductive resistance, which is not desirable. The properly designed and manufactured pins will increase net radiation and convective heat transferred to a coil from surrounding flowing combustion gasses, flame and furnace refractory. Their positive impact on radiation heat transfer is not only because more heat can be absorbed through the increased coil external surface so the contact area between combustion gases and coil is increased, but also because the relative heat loss through the radiating coil surface is reduced, as the coil surface is not smooth any more. Accordingly, as a pin radiates energy to its surroundings, part of this energy is delivered to and captured by other pins, thus it is re-directed back to the coil surface. The pins will also increase the convective heat transfer to a coil, due to increase in coil external surface that is in contact with flowing combustion gas, but also by increasing turbulence along the coil surface and by reducing the thickness of a boundary layer.

The pins may comprise up to 5% to 25%, or, for example, from 5% to 20% of the weight of the coil pass (7). One of the limiting issues to consider is the creep of the coil pass (7) given the additional weight of the pins. However, it should be noted that an array of pins will place less stress on the coil pass than a continuous fin (e.g., there is less mass to support). This may also affect the location and concentration of the pins. It may reduce creep if there are more pins on the upper surface of the pass. In some embodiments, the pins have the same composition as the material of the pass (7) of the radiant coil.

In one embodiment, the tube may be manufactured by welding (electrically) any stud shaped strip (e.g., a wire or a welding rod) to the surface of the tube at a desired location and then cutting the strip at the desired length.

The pass of the coil may be a tube of stainless steel which may be selected from wrought stainless, austenic stainless steel and HP, HT, HU, HW and HX stainless steel, heat resistant steel, and nickel based alloys. The coil pass may be a high strength low alloy steel (HSLA); high strength structural steel or ultra high strength steel. The classification and composition of such steels are known to those skilled in the art.

In one embodiment, the stainless steel, for example, heat resistant stainless steel may comprises from 13 to 50, or, for example, 20 to 50, or, for example, from 20 to 38 weight % of chromium. The stainless steel may further comprise from 20 to 50, for example, from 25 to 50, or, for example, from 25 to 48, or, for example, from about 30 to 45 weight % of Ni. The balance of the stainless steel may be substantially iron.

In some embodiments, the present invention may also be used with nickel and/or cobalt based extreme austenic high temperature alloys (HTAs). In some embodiments, the alloys comprise a major amount of nickel or cobalt. In some embodiments, the high temperature nickel based alloys comprise from about 50 to 70, or, for example, from about 55 to 65 weight % of Ni; from about 20 to 10 weight % of Cr; from about 20 to 10 weight % of Co; and from about 5 to 9 weight % of Fe and the balance one or more of the trace elements noted below to bring the composition up to 100 weight %. In some embodiments, the high temperature cobalt based alloys comprise from 40 to 65 weight % of Co; from 15 to 20 weight % of Cr; from 20 to 13 weight % of Ni; less than 4 weight % of Fe and the balance one or more trace elements as set out below and up to 20 weight % of W. The sum of the components adding up to 100 weight %.

In some embodiments, the steel may further comprise a number of trace elements including at least 0.2 weight %, up to 3 weight %, or, for example, 1.0 weight %, up to 2.5 weight %, or, for example, not more than 2 weight % of manganese; from 0.3 to 2, or, for example, 0.8 to 1.6, or, for example, less than 1.9 weight % of Si; less than 3, or, for example, less than 2 weight % of titanium, niobium (for example, less than 2.0, or, for example, less than 1.5 weight % of niobium) and all other trace metals; and carbon in an amount of less than 2.0 weight %. The trace elements are present in amounts so that the composition of the steel totals 100 weight %.

EXAMPLE

The present invention will now be illustrated by the following non limiting example.

Example 1

A finite element model of the ethylene 1 furnace tubes was performed in ANSYS Mechanical 14.0. This is a commercial finite element analysis (FEA) software used to create numerical models for stress/strain and heat transfer analysis.

Figure 1:
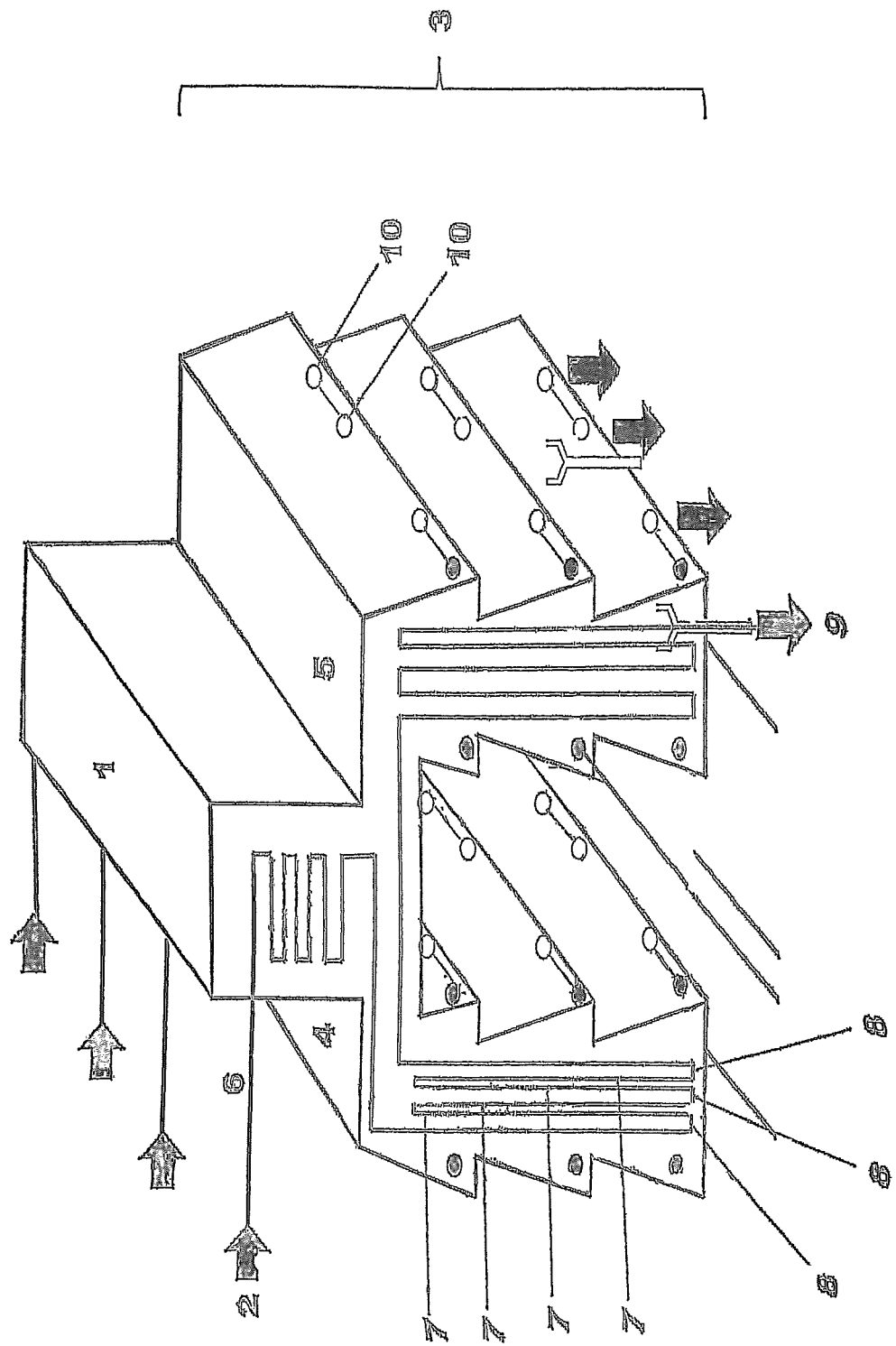
FIG. 1 is a schematic drawing of an ethylene cracker.
Figure 2:
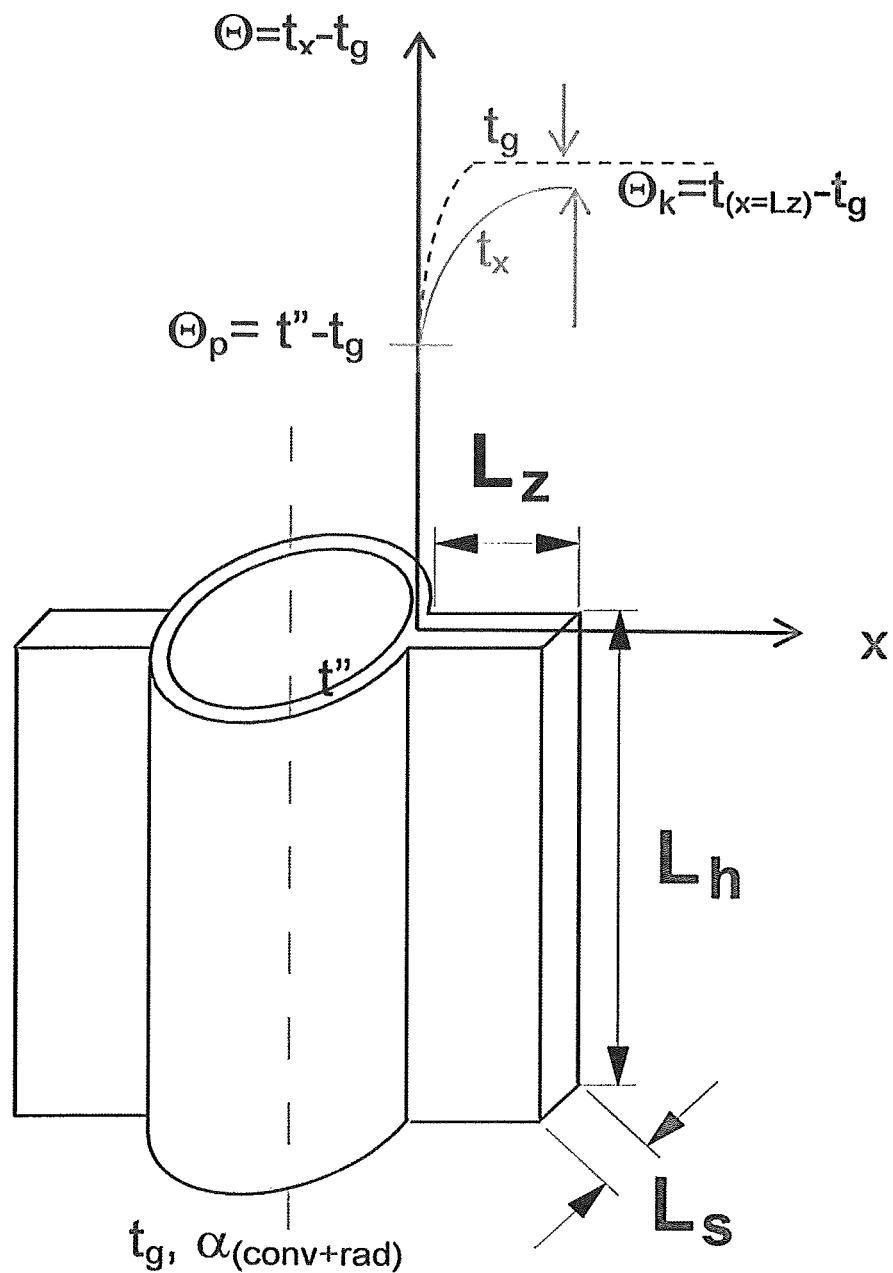
FIG. 2 shows the geometry of a single longitudinal vertical fin with rectangular cross section.

Prior to performing a FEA analysis a heat transfer model of a rectangular fin (FIG. 2) was created for a one-dimensional heat distribution. The net heat conducted through the fin is equal to heat transferred to the fin external surface from surroundings, $$Q_{x+dx} - Q_x = Q_\alpha: \frac{d}{dx}\left(A\frac{d\Theta}{dx}\right) = \frac{\alpha O}{\lambda}\Theta$$

Where $\Theta = t_g - t_x$—the temperature difference between combustion gases, $t_g$, and local temperature in the fin, $t_x$, at location x ($0 \leq x \leq L_z$)

i) $O = 2(L_s + L_h)$—the perimeter of the cross section of the rectangular fin,
$\lambda$—thermal conductivity of the fin material,
$\alpha$—total heat transfer coefficient ($\alpha = \alpha_{rad+conv}$)
from the above equation.

$$\frac{d^2\Theta}{dx^2} = B^2\Theta$$

$$B \equiv \sqrt{\frac{\alpha\,O}{\lambda\,A}}$$

The general solution of this equation takes the form:

$$\Theta_x = C_1 e^{Bx} + C_2 e^{-Bx}$$

where the constants $C_1$ and $C_2$ are determined from two boundary conditions:

for $x = 0$  $\Theta = \Theta_p = C_1 + C_2$ for $x = L_z$  $\Theta = \Theta_k = C_1 e^{BL} + C_2 e^{-BL}$ and, $Q_\lambda = Q_\alpha = -A\lambda\left(\frac{d\Theta}{dx}\right)_{x=Lz} = A\alpha\Theta_k$ So, after calculating $C_1$ and $C_2$, the temperature distribution in the fin takes the form:

$$\Theta_x = \Theta_p = \frac{\cosh[B(L_z - x)] + \frac{\alpha}{\beta\lambda}\sinh[B(L_z - x)]}{\cosh BL_z + \frac{\alpha}{B\lambda}\sinh BL_z}$$

Figure 3:
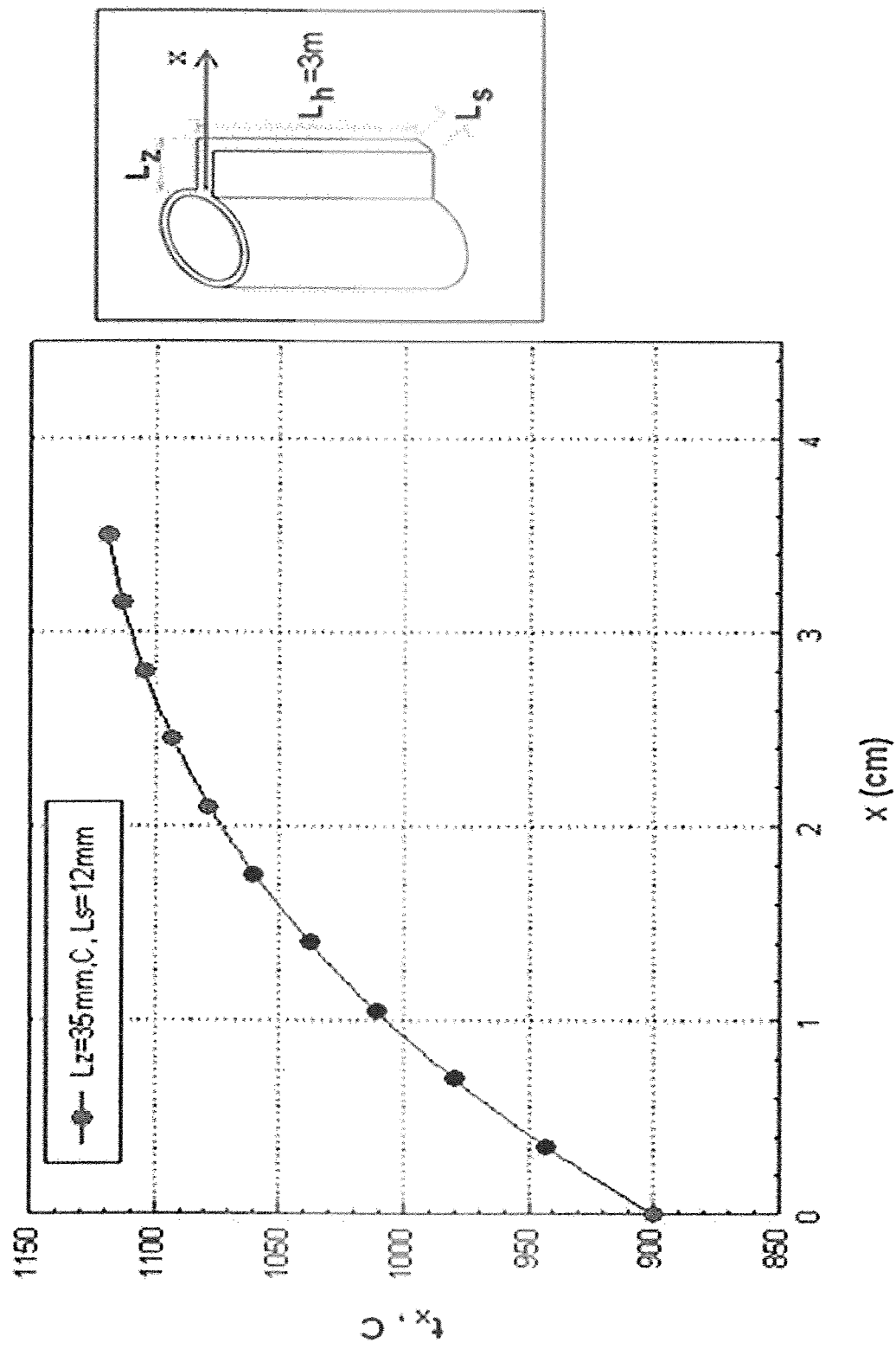
FIG. 3 shows an axial fin temperature distribution with increasing height of the fin.

This temperature distribution is shown in FIG. 3 for a base temperature of 900° C. which was used for generating temperature loads on the axial finned tube.

Figure 4A:
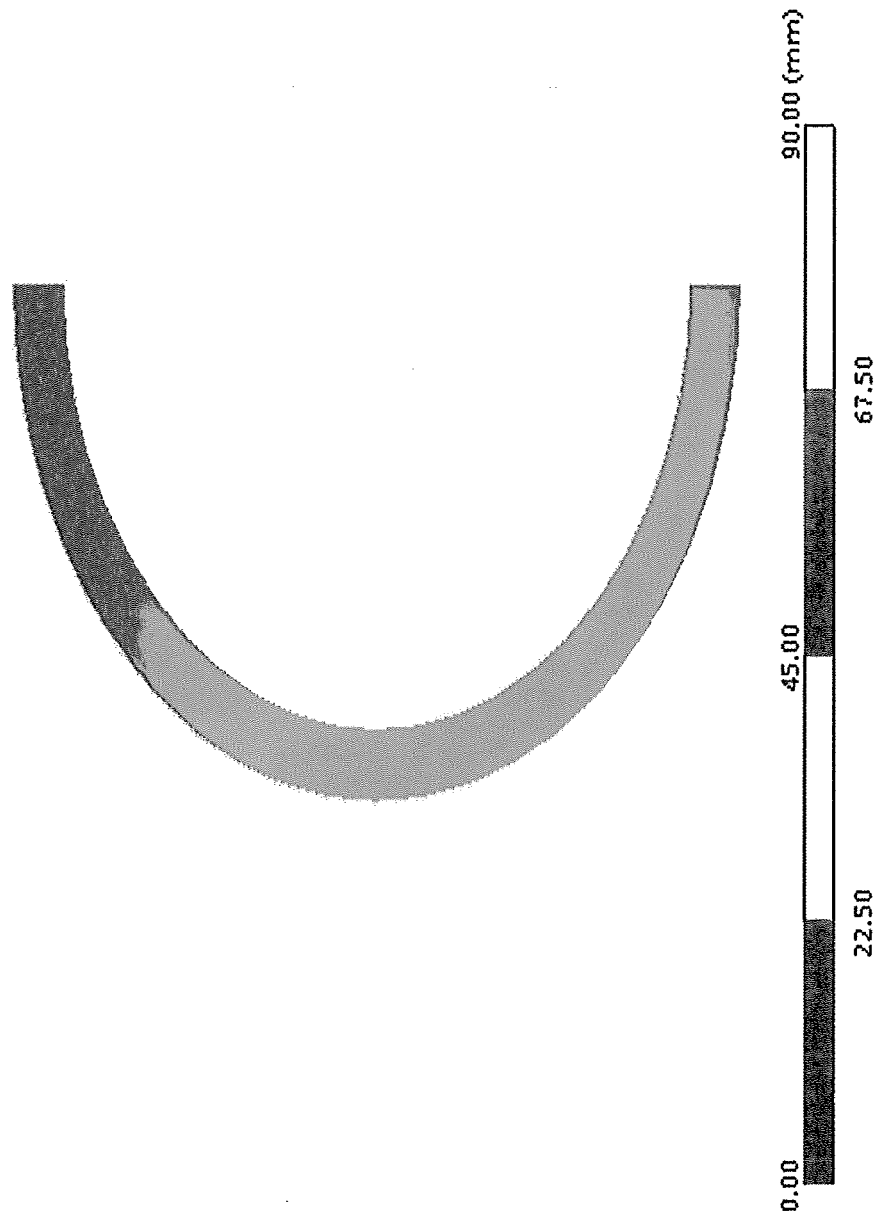
FIGS. 4A, 4B and 4C show a half cross section of bare tube (FIG. 4A), axial finned tube (FIG. 4B), and pinned tube (FIG. 4C).
Figure 4B:
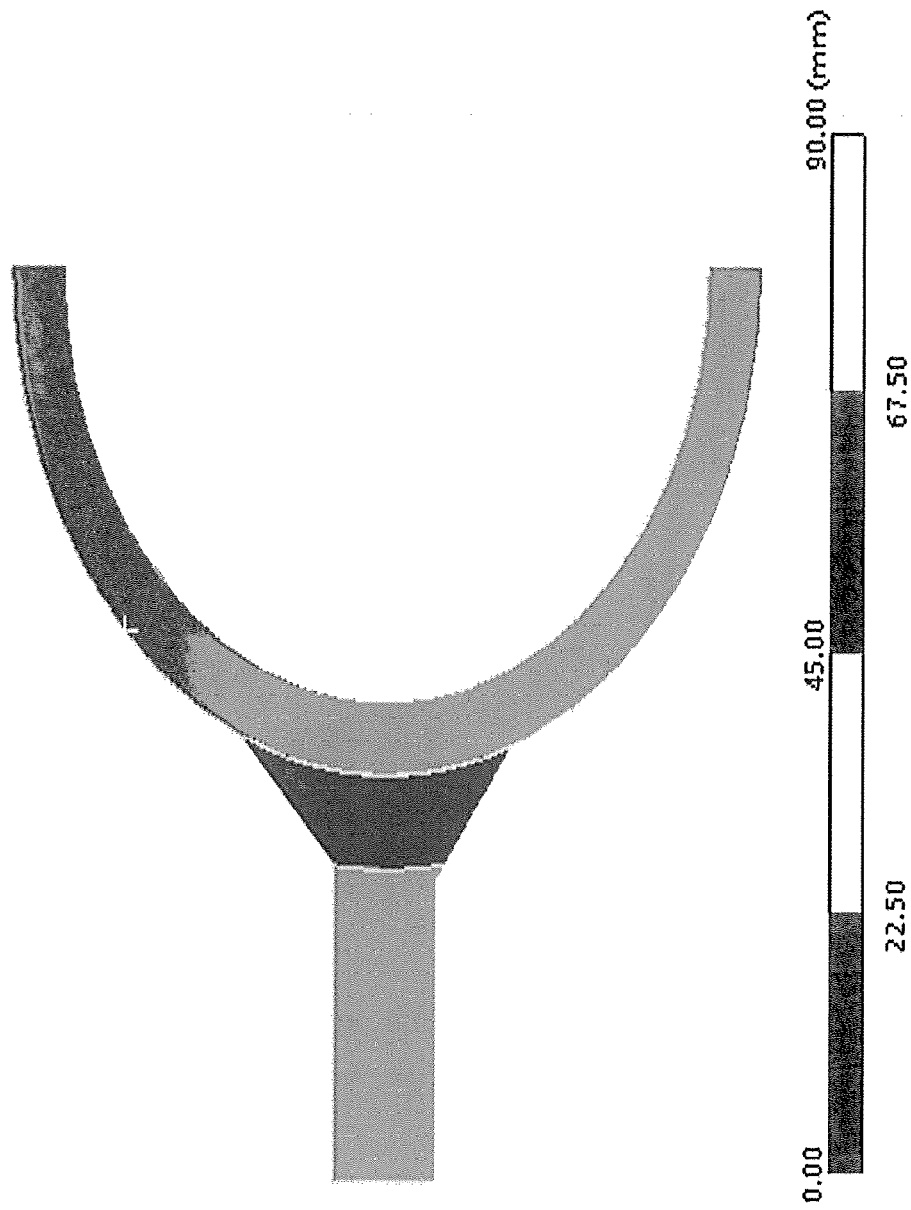
Figure 4C:
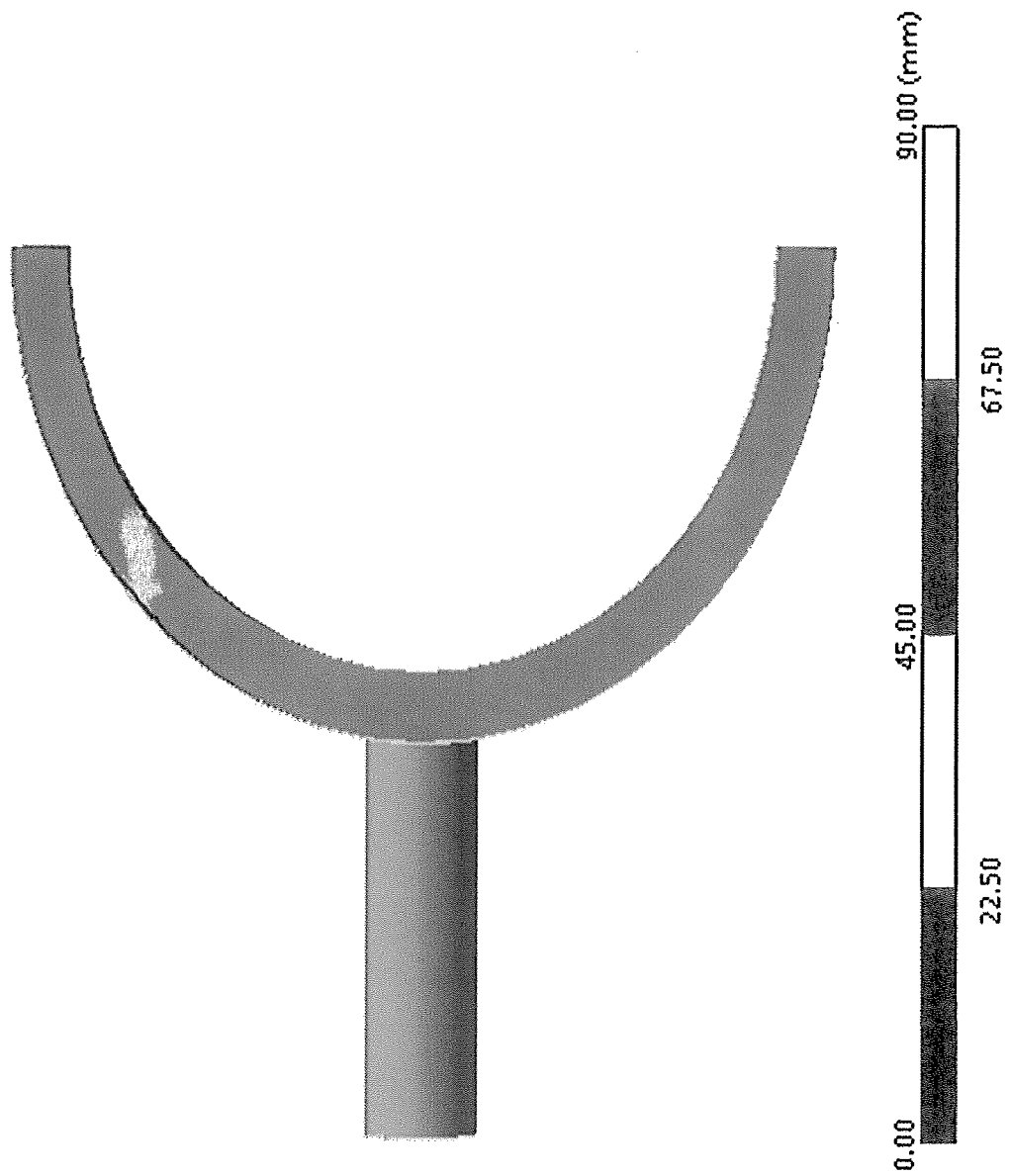
Figure 5A:
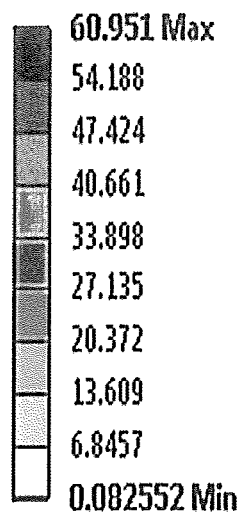
FIGS. 5A, 5B and 5C show the outside wall stress distribution for bare tube (FIG. 5A), axial finned tube (FIG. 5B), and pinned tube (FIG. 5C).
Figure 5A:
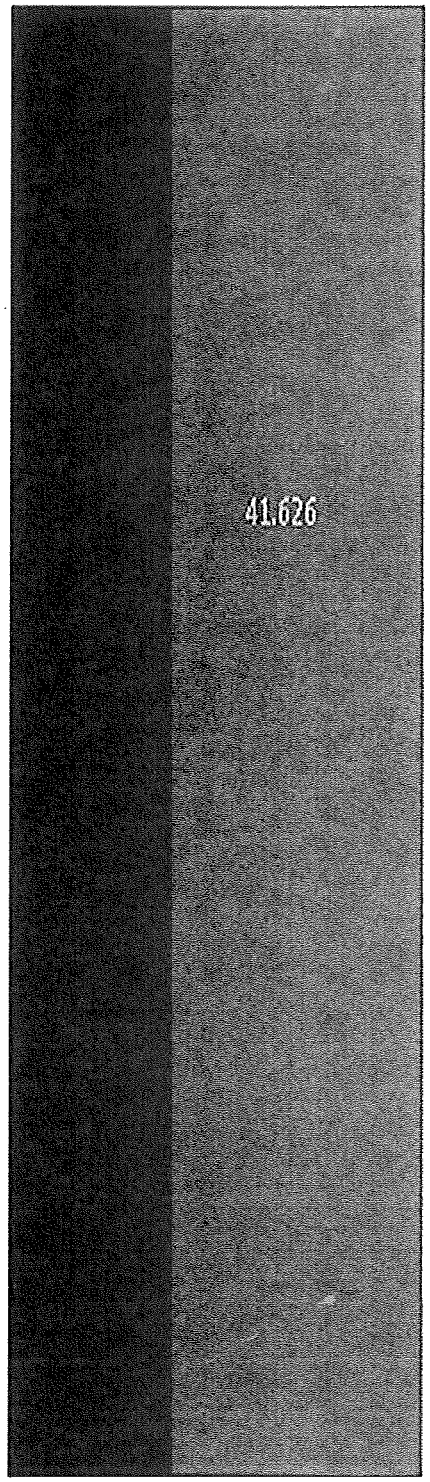
Figure 5B:
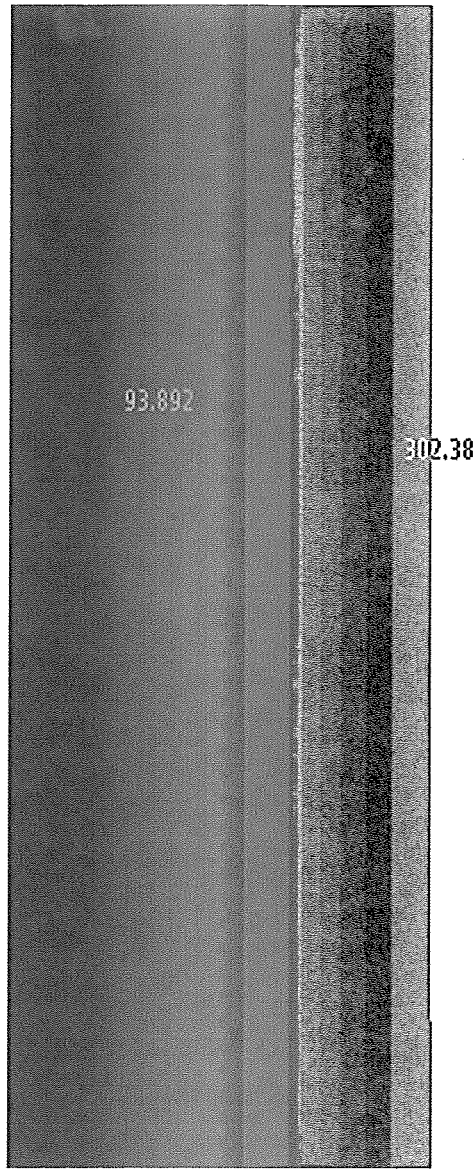
Figure 5C:
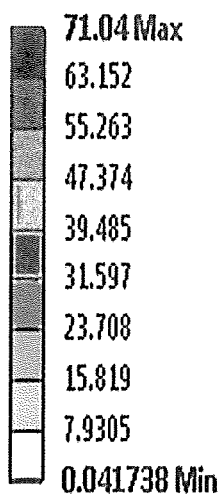
Figure 5C:
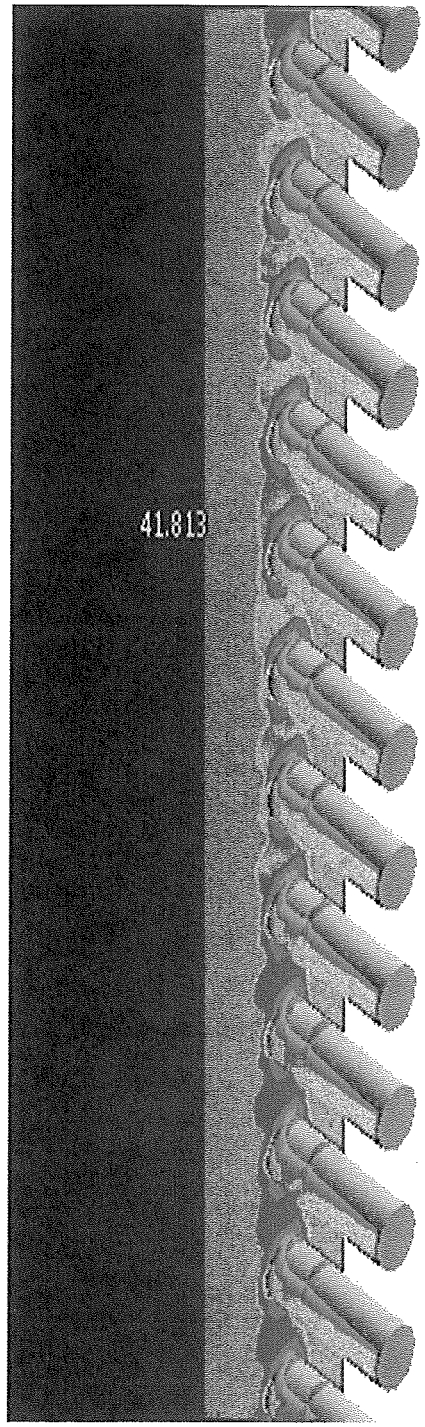
Figure 6A:
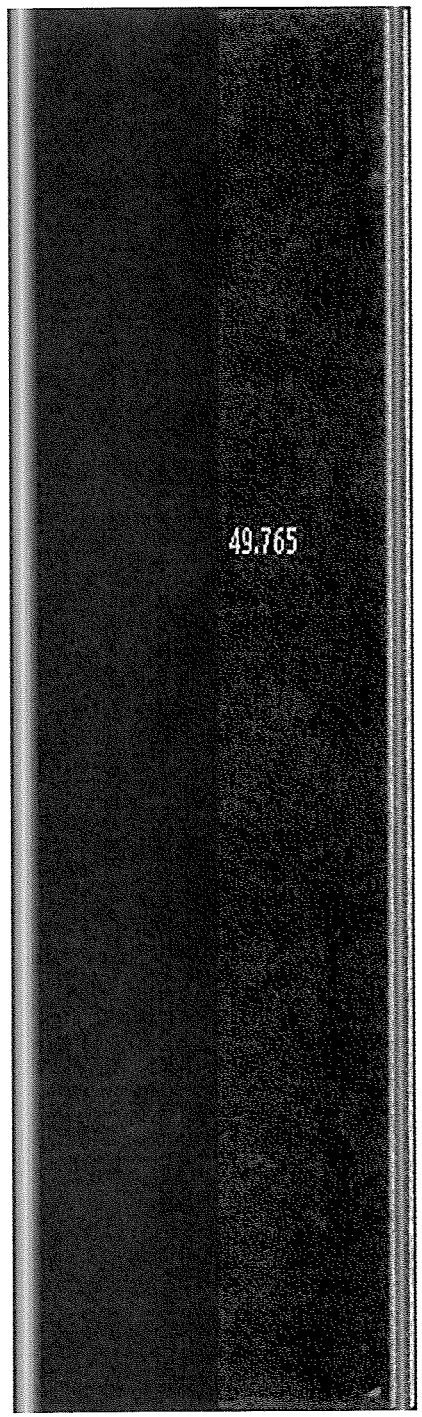
FIGS. 6A, 6B and 6C show the inside wall stress distribution for bare tube (FIG. 6A), axial finned tube (FIG. 6B), and pinned tube (FIG. 6C).
Figure 6A:
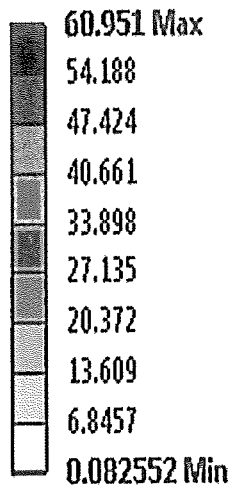
Figure 6B:
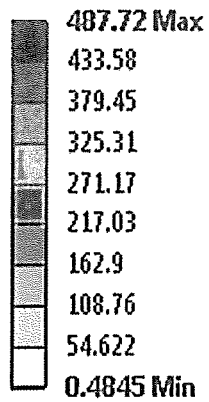
Figure 6B:
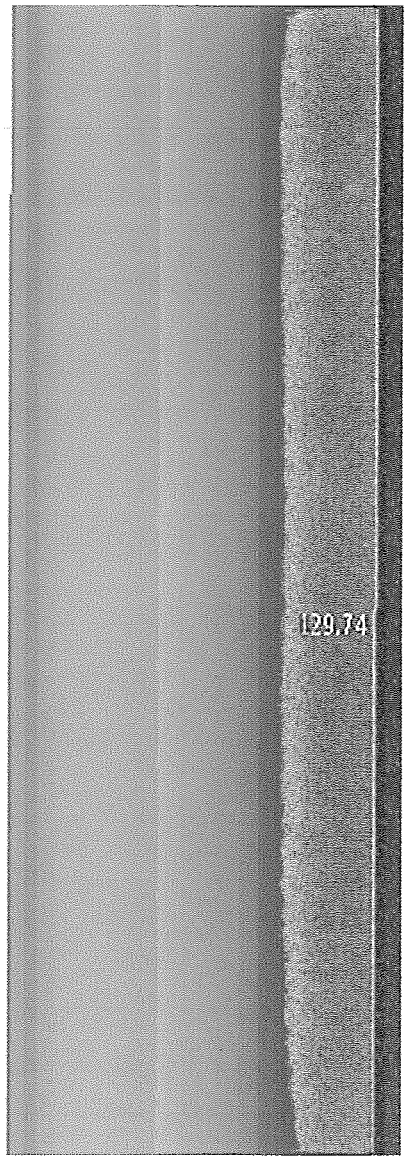
Figure 6C:
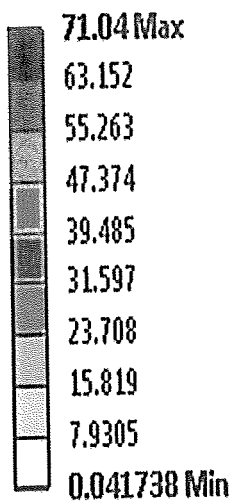
Figure 6C:
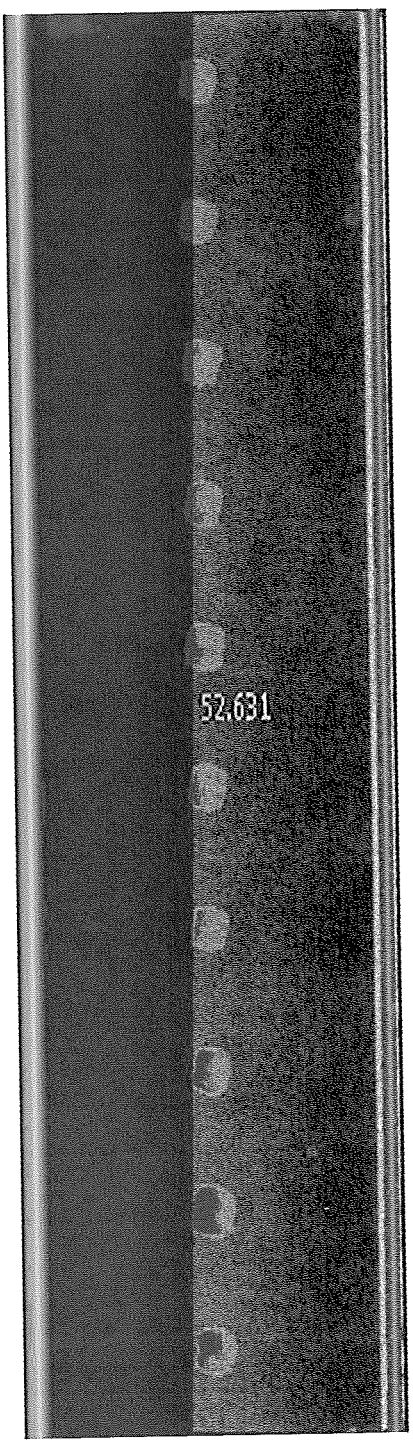

A static structural FEA was performed on three different furnace tubes; a bare tube, an axial finned tube, and a pinned tube. Half models were created with symmetric boundary conditions. A cross section of each of the tubes is shown in FIGS. 4A, 4B and 4C. The temperature distribution described above was applied to the external surface of the finned and pinned tube. Since the above heat transfer analysis was not performed for a pinned tube, the external surfaces of the pinned tube were assumed to follow the same distribution. An average process temperature of approximately 750° C. and an average convective heat transfer coefficient of 998 W/m²K were used to define the thermal boundary condition on the inner surface of the tube. Both gravity and an internal tube pressure of 0.336 MPa were also applied to the furnace tube model. The temperature distribution described above was determined for an axial finned tube and the assumption was made that the distribution would be similar in a pinned tube.

External and internal stress distributions are shown in FIGS. 5A, 5B and 5C and FIGS. 6A, 6B and 6C. As seen in these figures, the finned furnace tube is in a much higher state of stress than the bare furnace tube. The difference in thermal expansion of the tip and base of the axial fin causes the base tube to be put in a high state of tension.

The advantage of the pinned tube is that it is not constrained in any direction and is free to expand. There is a slight stress concentration at the base of the pin; however the overall state of stress is much lower than that of the axial finned tube. The overall state of stress in the furnace tube is comparable to that of a bare tube. However, there is an increase in heat transfer in the pinned tube over the bare tube.

What is claimed is:

1. A tube for use in the radiant section of a furnace for cracking hydrocarbons to produce olefins having on its exterior surface a series of pins in one or more linear arrays parallel to the longitudinal axis of the tube, said pins having:
  i) a maximum height from 0.8 cm to 1 cm (paragraph 43);
  ii) a contact surface with the tube, having an area from 0.1%-10% of the tube external surface area;
  iii) a uniform cross section along the length of the pin;
  iv) length to diameter ratio from 1.5:1 to 0.5:1;
  v) a distance between consecutive pins within a given linear array is from 0.1 to 5 times the diameter of the pin; and
  vi) from 2 to 6 linear arrays of pins radially spaced from 180° to 20° apart.

2. The tube according to claim 1, wherein the pins have a maximum length from 3%-15% of the tube outer diameter.

3. The tube according to claim 2 comprising from about 55 to 65 weight % of Ni; from about 20 to 10 weight % of Cr; from about 20 to 10 weight % of Co; and from about 5 to 9 weight % of Fe and the balance one or more of the trace elements.

4. The tube according to claim 3 further comprising from 0.2 up to 3 weight % of Mn; from 0.3 to 2 weight % of Si; less than 5 weight % of titanium, niobium and all other trace metals; and carbon in an amount of less than 0.75 weight % the sum of the components adding up to 100 weight %.

5. The tube according to claim 2, comprising from 40 to 65 weight % of Co; from 15 to 20 weight % of Cr; from 20 to 13 weight % of Ni; less than 4 weight % of Fe and the balance of one or more trace elements and up to 20 weight % of W the sum of the components adding up to 100 weight %.

6. The tube according to claim 5, further comprising from 0.2 up to 3 weight % of Mn; from 0.3 to 2 weight % of Si; less than 5 weight % of titanium, niobium and all other trace metals; and carbon in an amount of less than 0.75 weight %.

7. The tube according to claim 2, comprising from 20 to 38 weight % of chromium from 25 to 48, weight % of Ni.

8. The tube according to claim 7, further comprising from 0.2 up to 3 weight % of Mn, from 0.3 to 2 weight % of Si; less than 5 weight % of titanium, niobium and all other trace metals; and carbon in an amount of less than 0.75 weight % and the balance substantially iron.

9. The tube according to claim 3, wherein the cross section of the pin is round.

10. The tube according to claim 5, wherein the cross section of the pin is round.

11. The tube according to claim 7, wherein the cross section of the pin is round.

12. The tube according to claim 4, wherein the cross section of the pin is round.

13. The tube according to claim 3, wherein the cross section of the pin is quadrilateral.

14. The tube according to claim 5, wherein the cross section of the pin is quadrilateral.

15. The tube according to claim 7, wherein the cross section of the pin is quadrilateral.

16. The tube according to claim 4, wherein the cross section of the pin is quadrilateral.

17. Tube according to claim 2, wherein the pins in a linear array are of uniform height.

18. The tube according to claim 2, where in the spacing between pins in a linear array is from 0.5 to 5 times the diameter of the pin.

19. The tube according to claim 2, wherein the pins in a linear array are of different heights to provide a profile to the array.

20. The tube according to claim 19, wherein at least part of the profile is a taper.

21. The tube according to claim 2, where in the central axis of the pin is at an angle from 90° to 60° relative to the external surface of the tube.

22. A method for making a tube according to claim 1, electrically welding a strip of any stud shaped material to the surface of the tube and then cutting the strip at the desired length.

* * * * *